(12) United States Patent
Mizoguchi

(10) Patent No.: US 12,502,053 B2
(45) Date of Patent: Dec. 23, 2025

(54) IMAGING SYSTEM, ENDOSCOPE, AND CONTROL DEVICE

(71) Applicant: OLYMPUS CORPORATION, Hachioji (JP)

(72) Inventor: Hideaki Mizoguchi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 449 days.

(21) Appl. No.: 18/096,187

(22) Filed: Jan. 12, 2023

(65) Prior Publication Data

US 2023/0156362 A1 May 18, 2023

Related U.S. Application Data

(63) Continuation of application No. PCT/JP2020/027410, filed on Jul. 14, 2020.

(51) Int. Cl.
*A61B 1/00* (2006.01)
*A61B 1/045* (2006.01)
*H04N 23/50* (2023.01)

(52) U.S. Cl.
CPC ...... *A61B 1/00124* (2013.01); *A61B 1/00114* (2013.01); *A61B 1/045* (2013.01); *H04N 23/555* (2023.01)

(58) Field of Classification Search
CPC . A61B 1/00124; A61B 1/00114; A61B 1/045; H04N 23/555; H04N 23/65; H04N 25/709; H04N 25/76
See application file for complete search history.

(56) References Cited

U.S. PATENT DOCUMENTS 4,745,470 A * 5/1988 Yabe ............... H04N 23/66
600/109
2010/0168744 A1* 7/2010 Sugiyama ............ A61B 5/0538
340/687

(Continued)

FOREIGN PATENT DOCUMENTS

EP 3 205 256 A1 8/2017
JP 2011-206333 A 10/2011

(Continued)

OTHER PUBLICATIONS

International Search Report dated Sep. 15, 2020, issued in counterpart International Application No. PCT/JP2020/027410. (3 pages).

*Primary Examiner* — Anh Tuan T Nguyen
*Assistant Examiner* — Jae Woo
(74) *Attorney, Agent, or Firm* — WHDA, LLP

(57) ABSTRACT

An imaging system includes: an imaging unit configured to generate a video signal; a control device configured to control the imaging unit; a first signal line configured to transmit a predetermined power supply voltage to the imaging unit; and a second signal line configured to transmit the video signal to the 284 control device. The imaging unit includes an imaging element including a pixel portion configured to generate the video signal according to a light reception amount and output the generated video signal to the second signal line, and a first detector configured to detect a voltage value of a power supply voltage that has reached the imaging unit via the first signal line as a voltage value of a first power supply voltage and output the voltage value to the second signal line.

10 Claims, 7 Drawing Sheets

(56) References Cited

U.S. PATENT DOCUMENTS

| | | | |
|---|---|---|---|
| 2012/0178992 A1* | 7/2012 | Fujimoto | H04N 7/183 600/109 |
| 2012/0253122 A1* | 10/2012 | Minetoma | A61B 1/000094 600/109 |
| 2013/0158352 A1* | 6/2013 | Imaizumi | A61B 1/00193 600/111 |
| 2013/0265403 A1* | 10/2013 | Okawa | A61B 1/045 348/76 |
| 2015/0201827 A1* | 7/2015 | Sidar | A61B 1/00009 348/65 |
| 2016/0345814 A1* | 12/2016 | Sidar | A61B 1/0684 |
| 2017/0150869 A1* | 6/2017 | Adachi | A61B 1/00029 |
| 2019/0089920 A1* | 3/2019 | Nakamura | G02B 23/24 |
| 2019/0350447 A1* | 11/2019 | Kato | H04N 25/76 |
| 2020/0237183 A1* | 7/2020 | Yanagisawa | A61B 1/00057 |
| 2020/0412993 A1* | 12/2020 | Kawazu | H04N 25/673 |
| 2023/0225600 A1* | 7/2023 | Tani | H04N 25/709 600/118 |
| 2023/0232131 A1* | 7/2023 | Ogawa | A61B 1/00027 348/76 |
| 2024/0148233 A1* | 5/2024 | Yamamura | A61B 1/00006 |

FOREIGN PATENT DOCUMENTS

| | | |
|---|---|---|
| JP | 2015-192695 A | 11/2015 |
| JP | 6397603 B1 | 9/2018 |
| WO | 2012/008259 A1 | 1/2012 |
| WO | 2013/042647 A1 | 3/2013 |
| WO | 2018/088005 A1 | 5/2018 |
| WO | 2018/167912 A1 | 9/2018 |

\* cited by examiner

IMAGING SYSTEM, ENDOSCOPE, AND CONTROL DEVICE

CROSS-REFERENCE TO RELATED APPLICATION

This application is a continuation of International Application No. PCT/JP2020/027410, filed on Jul. 14, 2020, the entire contents of which are incorporated herein by reference.

BACKGROUND

1. Technical Field

The present disclosure relates to an imaging system, an endoscope, and a control device that generate image data by imaging the inside of a subject.

2. Related Art

Hitherto, there is known a technology of driving an imaging element in an optimum state regardless of an individual difference between imaging elements or an individual difference between cables by adjusting a power supply voltage for driving the imaging element provided at a distal end portion of an insertion portion to be inserted into a subject to an appropriate value according to the imaging element in an endoscope (for example, see JP 6397603 B2). With this technology, an A/D conversion circuit provided inside the imaging element measures the power supply voltage supplied from a control device to the imaging element via a signal line, and outputs the power supply voltage measurement result to the control device. The control device compares the power supply voltage measurement result input from the imaging element via the signal line with an optimum value, and adjusts a value of the power supply voltage to be output to the imaging element in such a way that the value of the power supply voltage approaches the optimum value.

SUMMARY

In some embodiments, an imaging system includes: an imaging unit configured to generate a video signal by imaging a subject; a control device configured to control the imaging unit; a first signal line configured to transmit a predetermined power supply voltage to the imaging unit; and a second signal line configured to transmit the video signal to the 284 control device. The imaging unit includes an imaging element including a pixel portion configured to generate the video signal according to a light reception amount and output the generated video signal to the second signal line, and a first detector configured to detect a voltage value of a power supply voltage that has reached the imaging unit via the first signal line as a voltage value of a first power supply voltage and output the voltage value to the second signal line, and the control device includes: a power source configured to supply a voltage value of a second power supply voltage to the imaging element via the first signal line; a second detector configured to detect a current value in the first signal line; a third detector configured to detect the voltage value of the second power supply voltage supplied by the power source; a calculator configured to calculate a resistance value of the first signal line based on the voltage value of the first power supply voltage, the current value, and a voltage detection value of the second power supply voltage detected by the third detector; and a power source controller configured to adjust the voltage value of the second power supply voltage to be supplied to the imaging element by the power source based on the current value, the resistance value, and a voltage value of a target power supply voltage in the imaging element, and supply the adjusted second power supply voltage to the first signal line.

In some embodiments, an endoscope includes: an imaging unit configured to generate a video signal by imaging a subject; a connector that is connectable to a control device; a first signal line configured to transmit a predetermined power supply voltage to the imaging unit; and a second signal line configured to transmit the video signal to the control device. The imaging unit includes an imaging element including a pixel portion configured to generate the video signal according to a light reception amount and output the generated video signal to the second signal line, and a first detector configured to detect a voltage value of a power supply voltage that has reached the imaging unit via the first signal line as a voltage value of a first power supply voltage and output the voltage value to the second signal line, and the connector includes: a power source configured to supply a second power supply voltage to the imaging element via the first signal line; a second detector configured to detect a current value in the first signal line; a calculator configured to calculate a resistance value of the first signal line based on the voltage value of the first power supply voltage, the current value, and a voltage detection value of the second power supply voltage; and a power source controller configured to adjust the voltage value of the second power supply voltage to be supplied to the imaging element by the power source based on the current value, the resistance value, and a voltage value of a target power supply voltage which is an optimum value of the power supply voltage in the imaging element, and supply the adjusted second power supply voltage to the first signal line.

In some embodiments, provided is a control device electrically connectable to an imaging unit configured to generate a video signal by imaging a subject by using a first signal line configured to transmit a predetermined power supply voltage to the imaging unit and a second signal line configured to transmit the video signal. The control device includes: a power source configured to supply a second power supply voltage to the imaging unit via the first signal line; a second detector configured to detect a current value in the first signal line; a third detector configured to detect a voltage value of the second power supply voltage; a calculator configured to calculate a resistance value of the first signal line based on a voltage value of a first power supply voltage that has reached the imaging unit via the first signal line and that is detected in the imaging unit, the current value, and a voltage detection value of the second power supply voltage detected by the third detector; and a power source controller configured to adjust the voltage value of the second power supply voltage to be supplied to the imaging unit by the power source based on the current value, the resistance value, and a voltage value of a target power supply voltage which is an optimum value of the power supply voltage in the imaging unit, and supply the adjusted second power supply voltage to the first signal line.

The above and other features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an endoscope system including an imaging device will be described as a mode for carrying out the present disclosure (hereinafter, referred to as "embodiment"), but the present disclosure is not limited thereto, and for example, an in-vehicle camera, a surgical microscope, a machine vision camera, and a monitoring camera including an imaging device can also be applied. Further, the disclosure is not limited by these embodiments. Further, in the description of the drawings, the same reference signs denote the same parts. Furthermore, it should be noted that the drawings are schematic, and a relationship between a thickness and a width of each member, a ratio of each member, and the like are different from actual ones. Further, the drawings include portions having different dimensions and ratios.

First Embodiment

Configuration of Endoscope System

Figure 1:
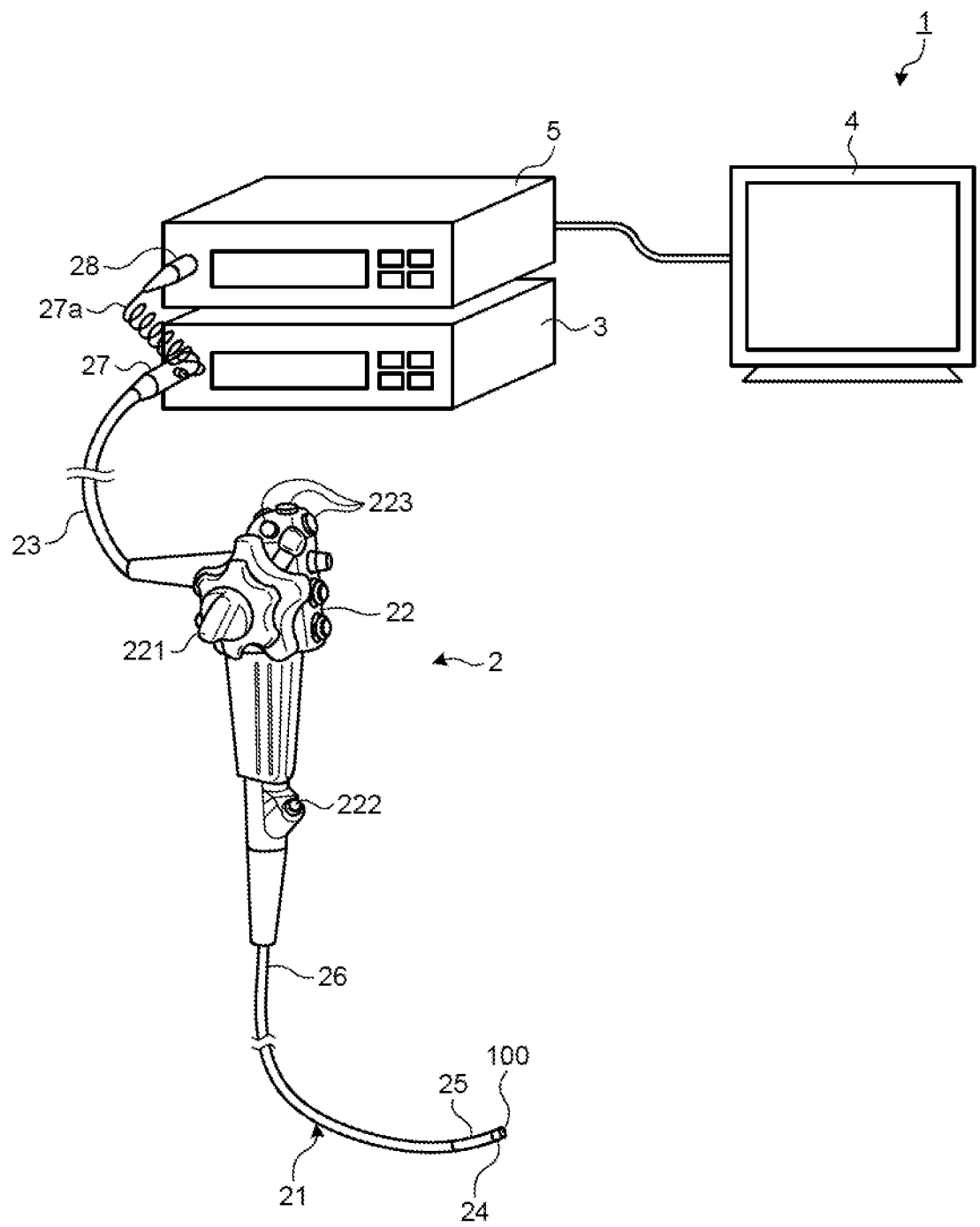
FIG. 1 is a diagram schematically illustrating an overall configuration of an endoscope system according to a first embodiment.

FIG. 1 is a diagram schematically illustrating an overall configuration of an endoscope system according to a first embodiment. An endoscope system 1 illustrated in FIG. 1 images the inside of a subject such as a patient by inserting an insertion portion of an endoscope into the subject, and displays a display image based on a video signal obtained by the imaging on a display device. A user such as a doctor observes the display image displayed on the display device. The endoscope system 1 includes an endoscope 2, a light source device 3, a display device 4, and a control device 5.
Configuration of Endoscope First, a configuration of the endoscope 2 will be described.

The endoscope 2 generates a video signal (raw data) obtained by imaging the inside of a body of a subject, and outputs the generated video signal to the control device 5. The endoscope 2 includes an insertion portion 21, an operating unit 22, and a universal cord 23.

The insertion portion 21 is inserted into the subject. The insertion portion 21 has an elongated shape having flexibility. The insertion portion 21 includes a distal end portion 24 incorporating an imaging device 100 to be described later, a bendable bending portion 25 including a plurality of bending pieces, and an elongated flexible tube portion 26 connected to a proximal end side of the bending portion 25 and having flexibility.

The distal end portion 24 is implemented using glass fiber or the like. The distal end portion 24 includes a light guide (not illustrated) forming a light guide path for illumination light supplied from the light source device 3, an illumination optical system provided at a distal end of the light guide, and the imaging device 100 to be described later.

The operating unit 22 includes a bending knob 221 that bends the bending portion 25 in a vertical direction and a horizontal direction, a treatment tool insertion portion 222 that inserts a treatment tool such as a biopsy forceps, a laser scalpel, or an inspection probe into a body cavity, and a plurality of switches 223 that are operation input units that input an operation instruction signal for a peripheral device such as an air supply unit, a water supply unit, or a gas supply unit in addition to the light source device 3 and the control device 5 or a pre-freeze signal that instructs the imaging device 100 to capture a still image. The treatment tool inserted from the treatment tool insertion portion 222 comes out from an aperture (not illustrated) via a treatment tool channel (not illustrated) of the distal end portion 24.

The universal cord 23 incorporates at least a light guide and a cable assembly including one or more cables. The cable assembly is a signal line for transmitting and receiving signals between the endoscope 2 and the light source device 3, and the control device 5, and includes a signal line for transmitting and receiving a captured image (image data), a signal line for transmitting and receiving a timing signal for driving the imaging device 100 (a synchronization signal and a clock signal), a signal line for supplying power to the imaging device 100, and the like. The universal cord 23 includes a connector 27 detachable from the light source device 3. A coil-shaped coil cable 27a extends in the connector 27, and a connector 28 detachably attached to the control device 5 at an extending end of the coil cable 27a is provided.
Configuration of Light Source Device Next, a configuration of the light source device 3 will be described.

The light source device 3 supplies the illumination light for the endoscope 2 to irradiate the subject under the control of the control device 5. The light source device 3 is implemented by using, for example, a halogen lamp, a laser diode (LD), a white light emitting diode (LED), and the like. The light source device 3 supplies the illumination light to the distal end portion 24 of the insertion portion 21 via the connector 27, the universal cord 23, and the insertion portion 21. Here, the illumination light is either white light or special light (for example, narrow band imaging (NBI) or infrared light).
Configuration of Display Device Next, a configuration of the display device 4 will be described.

The display device 4 displays the display image based on an imaging signal input from the control device 5 under the control of the control device 5. The display device 4 is implemented by using a display panel such as organic electro luminescence (EL) or liquid crystal.

Configuration of Control Device Next, a configuration of the control device 5 will be described.

The control device 5 controls each unit of the endoscope system 1. The control device 5 performs various types of image processing on the video signal input from the endoscope 2 and outputs the video signal to the display device 4. In addition, the control device 5 controls the light source device 3 to supply the illumination light to the endoscope 2.

Main Part of Endoscope System

Figure 2:
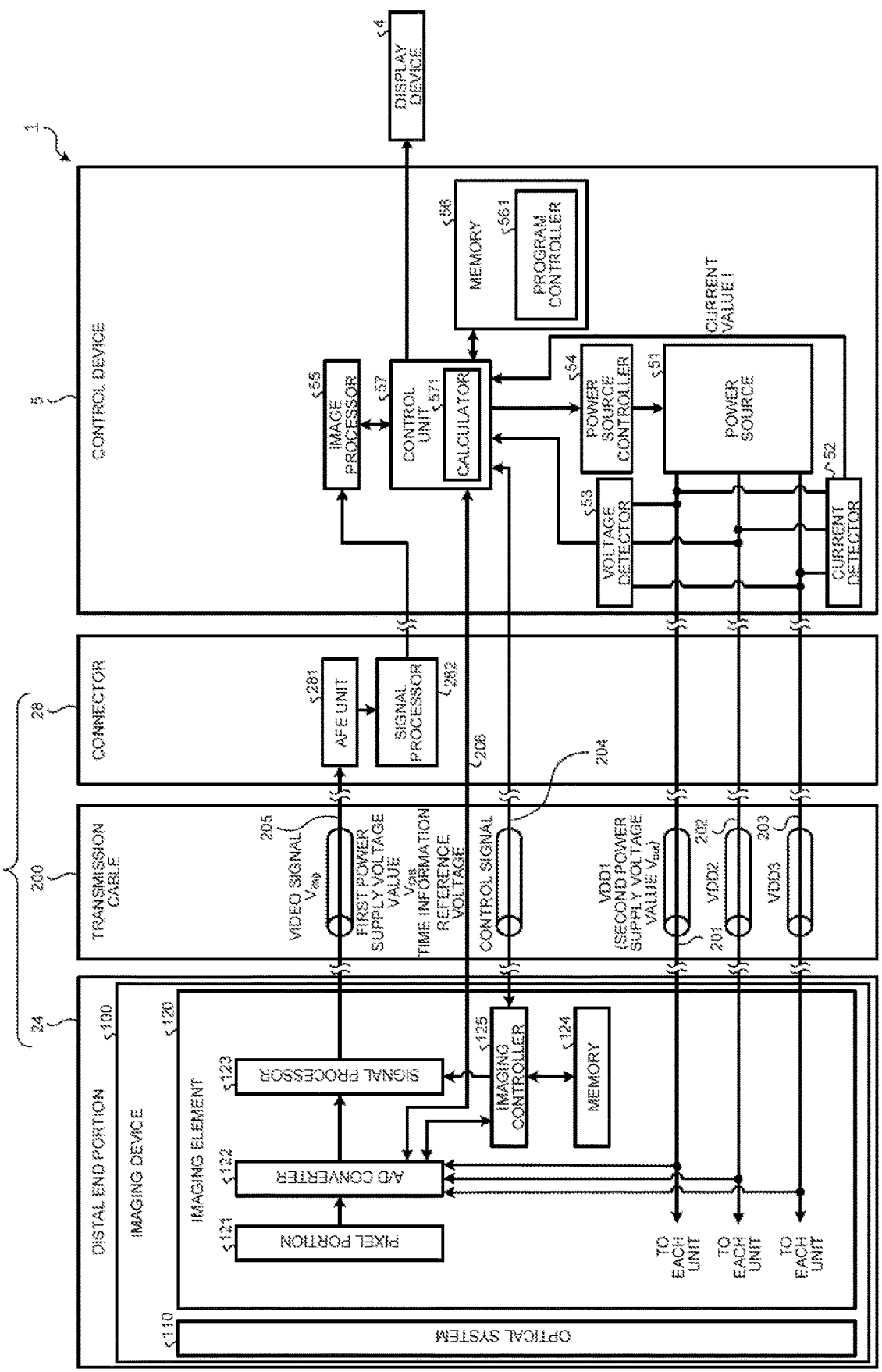
FIG. 2 is a block diagram illustrating a functional configuration of main parts of an endoscope and a control device in the endoscope system according to the first embodiment.

Next, a configuration of main parts of the endoscope 2 and the control device 5 described above will be described, FIG. 2 is a block diagram illustrating a functional configuration of main parts of the endoscope 2 and the control device 5 in the endoscope system 1.

Main Part of Endoscope

First, a functional configuration of the main part of the endoscope 2 will be described.

The endoscope 2 includes the imaging device 100, a transmission cable 200 incorporated in the universal cord 23, and the connector 28.

First, the imaging device 100 will be described.

The imaging device 100 is arranged at the distal end portion 24 of the endoscope 2, generates the video signal (raw data) by imaging the inside of the subject, and outputs the video signal to the control device 5 via the transmission cable 200 of the universal cord 23 and the connector 28. The imaging device 100 includes an optical system 110 and an imaging element 120.

The optical system 110 condenses reflected light of the illumination light reflected by the subject to form a subject image on a light receiving surface of the imaging element 120. The optical system 110 is implemented by using one or more lenses and the like.

The imaging element 120 receives the subject image formed by the optical system 110, generates a pixel signal by performing photoelectric conversion, and generates a digital video signal (raw data) by performing A/D conversion processing, signal processing, and the like on the pixel signal. Then, the imaging element 120 outputs the video signal to the connector 28 via the transmission cable 200. The imaging element 120 is implemented by using an image sensor such as a complementary metal oxide semiconductor (CMOS) image sensor or a charge coupled device (CCD) image sensor. The imaging element 120 includes a pixel portion 121, an A/D converter 122, a signal processor 123, a memory 124, and an imaging controller 125.

The pixel portion 121 includes a plurality of pixels arranged in a two-dimensional matrix. The pixel portion 121 is implemented by using a photoelectric conversion element (photodiode) or the like. The pixel portion 121 outputs a pixel signal of each pixel to the A/D converter 122 under the control of the imaging controller 125. Furthermore, the pixel portion 121 is driven according to a power supply voltage input from the control device 5 via the transmission cable 200.

Under the control of the imaging controller 125, the A/D converter 122 performs A/D conversion processing on the pixel signal input from the pixel portion 121 based on a reference voltage $V_{ref}$ transmitted from a control unit 57 of the control device 5 via the transmission cable 200 to be described later, and outputs the pixel signal to the signal processor 123. The reference voltage $V_{res}$ can also be generated inside the imaging element 120 based on any of power supply voltages VDD1 to VDD3. Furthermore, under the control of the imaging controller 125, the A/D converter 122 performs A/D conversion on a voltage value of a first power supply voltage that has reached the imaging element 120 via the transmission cable 200 and is to be transmitted to the control unit 57 of the control device 5 to be described later as being detected in the imaging element 120 (hereinafter, simply referred to as "reaching voltage value $V_{cis}$"), and outputs a result of the A/D conversion to the signal processor 123. Specifically, under the control of the imaging controller 125, the A/D converter 122 outputs a result of performing A/D conversion on the reaching voltage value $V_{cis}$ to the signal processor 123 in a current consumption fluctuation period between a blanking period of the imaging element 120 and a pixel reading period. The A/D converter 122 is electrically connected to each of a signal line 201, a signal line 202, and a signal line 203 of the transmission cable 200 described later. The A/D converter 122 is implemented by using an A/D conversion circuit or the like.

Under the control of the imaging controller 125, the signal processor 123 performs various types of signal processing on the digital pixel signal input from the A/D converter 122 to generate the digital video signal, and outputs the video signal to the transmission cable 200. Here, the various types of signal processing include noise reduction processing, amplification processing, and the like. In addition, the signal processor 123 outputs the reaching voltage value $V_{cis}$ input from the A/D converter 122 to the transmission cable 200 under the control of the imaging controller 125. The signal processor 123 is implemented using a noise reduction circuit, an output amplifier circuit, and the like.

The memory 124 is implemented by using a read only memory (ROM), a random access memory (RAM), or the like, and records various types of information regarding the imaging element 120. The memory 124 records various programs to be executed by the imaging element 120, data being processed, identification information for identifying the imaging element 120, performance information (a drive voltage and a drive current) of the imaging element 120, defective pixel information such as a black defect and white defect in the pixel portion 121, and the like.

The imaging controller 125 controls operation of each unit included in the imaging element 120 according to a control signal input from the control device 5 via the transmission cable 200. Here, the control signal includes, for example, a synchronization signal (a vertical synchronization signal or a horizontal synchronization signal), a clock signal, a mode signal for instructing the operation of the imaging element 120, and the like. The imaging controller 125 outputs a pixel signal from each pixel of a predetermined read line in the pixel portion 121 to the A/D converter 122 according to the control signal input from the control device 5 via the transmission cable 200. The imaging controller 125 includes a timing generator (TG), a vertical scanning circuit, a horizontal scanning circuit, and the like.

Next, the transmission cable 200 will be described.

The transmission cable 200 is implemented by using a plurality of signal lines. Specifically, the transmission cable 200 includes at least the signal line 201, the signal line 202, the signal line 203, a signal line 204, a signal line 205, and a signal line 206. The signal line 201 transmits the power supply voltage VDD1 input from the control device 5 to the imaging element 120. The signal line 202 transmits the power supply voltage VDD2 input from the control device 5 to the imaging element 120. The signal line 203 transmits the power supply voltage VDD3 input from the control device 5 to the imaging element 120. The signal line 204 transmits, to the imaging element 120, the control signal input from the control device 5, and transmits, to the control device 5, the reaching voltage values of the power supply voltages VDD1 to VDD3 that are input from the imaging element 120 and have reached the imaging element 120. The signal line 205 transmits a video signal $V_{out}$ input from the imaging element 120 to the connector 28. The signal line 206 transmits the reference voltage $V_{ref}$ input from the control unit 57 of the control device 5 to the imaging element 120.

Next, the connector 28 will be described.

The connector 28 is detachably connected to the control device 5. The connector 28 includes at least an analog front end unit 281 (hereinafter, referred to as an "AFE unit 281") and a signal processor 282.

The AFE unit 281 performs processing such as noise removal on the video signal $V_{out}$ transmitted from the signal line 205 or the reaching voltage value $V_{cis}$, and outputs the video signal $V_{out}$ or the reaching voltage value $V_{cis}$ to the signal processor 282.

The signal processor 282 performs predetermined signal processing, such as format conversion processing, gain-up processing, or D/A conversion processing, on the video signal $V_{out}$ or the reaching voltage value $V_{cis}$ input from the AFE unit 281, and outputs the video signal $V_{out}$ or the reaching voltage value $V_{cis}$ to the control device 5.

Main Part of Control Device

Next, the main part of the control device 5 will be described.

The control device 5 includes a power source 51, a current detector 52, a voltage detector 53, a power source controller 54, an image processor 55, a memory 56, and the control unit 57.

Under the control of the power source controller 54, the power source 51 adjusts a power supply voltage input from an external power supply to the plurality of power supply voltages VDD1 to VDD3, and outputs the power supply voltages VDD1 to VDD3 to the transmission cable 200 (the signal lines 201 to 203). The power source 51 is implemented by using, for example, a smoothing circuit, a rectifier circuit, a transformer, or the like. Hereinafter, the voltage value of the power supply voltage VDD1 supplied from the power source 51 to the signal line 201 will be described as a voltage value $V_{out1}$ of a second power supply voltage. Hereinafter, the power supply voltage VDD1 output from the power source 51 to the signal line 201 will be described. Although the voltage value of the power supply voltage VDD2 and the voltage value of the power supply voltage VDD3 output to the signal line 202 and the signal line 203, respectively, are described as a voltage value $V_{out2}$ of the second power supply voltage and a voltage value Vats of the second power supply voltage, respectively, in a case where any one of the voltage value $V_{out1}$, the voltage value $V_{out2}$, and the voltage value $V_{out1}$ of the second power supply voltage is referred to, it is simply described as the voltage value $V_{out}$.

The current detector 52 is electrically connected to each of the signal lines 201 to 203. The current detector 52 detects a current value of each of the signal lines 201 to 203 and outputs the detection result to the control unit 57. The current detector 52 is implemented by using an ammeter or the like.

The voltage detector 53 is electrically connected to each of the signal lines 201 to 203. The voltage detector 53 detects the voltage value $V_{out}$ of each of the signal lines 201 to 203 and outputs the detection result to the control unit 57 as the voltage detection value $V_{mon}$. The voltage detector 53 is implemented by using a voltmeter or the like.

Under the control of the control unit 57, the power source controller 54 adjusts the voltage values of the plurality of power supply voltages output from the power source 51 to predetermined voltage values and outputs the voltage values to the power source 51. The power source controller 54 is implemented by using a memory and hardware such as a central processing unit (CPU).

The image processor 55 performs various types of image processing on the video signal input from the signal processor 282 of the connector 28, and outputs the video signal to the display device 4. Here, the various types of image processing include demosaic processing, white balance adjustment processing, γ correction processing, and the like. The image processor 55 is implemented by using a memory and hardware such as a field programmable gate array (FPGA) or a graphics processing unit (GPU).

The memory 56 records various types of information regarding the control device 5, image data corresponding to the video signal, data being processed, and the like. The memory 56 further includes a program recording unit 581 that records various programs to be executed by the control device 5. The memory 56 is implemented by using a volatile memory, a nonvolatile memory, or the like. The memory 56 may be implemented by using a memory card or the like that is detachable from the outside.

The control unit 57 controls each unit included in the endoscope system 1. The control unit 57 is implemented by using a memory and hardware such as a central processing unit (CPU) or an FPGA. The control unit 57 includes a calculator 571.

The calculator 571 calculates a resistance value R of the signal line 201 of the transmission cable 200 based on the reaching voltage value $V_{cis}$ input from the imaging element 120, a current value I input from the current detector 52, and the voltage detection value $V_{mon}$. In addition, the calculator 571 calculates the resistance value R of the signal line 201 of the transmission cable 200 a plurality of times in a predetermined period, and calculates an average value of the plurality of calculation results as the resistance value R of the signal line 201 of the transmission cable 200. Specifically, the calculator 571 calculates the resistance value R of the signal line 201 of the transmission cable 200 based on the reaching voltage value $V_{cis}$ input from the imaging element 120 and the current value I input from the current detector 52 for each blinking period of the imaging element 120 based on a vertical synchronization signal Ve input from the control unit 57. Similarly to the signal line 201, the calculator 571 calculates a resistance value of each of the signal line 202 and the signal line 203 of the transmission cable 200, but a detailed description thereof is omitted in order to simplify the description.

Processing in Endoscope System

Figure 3:
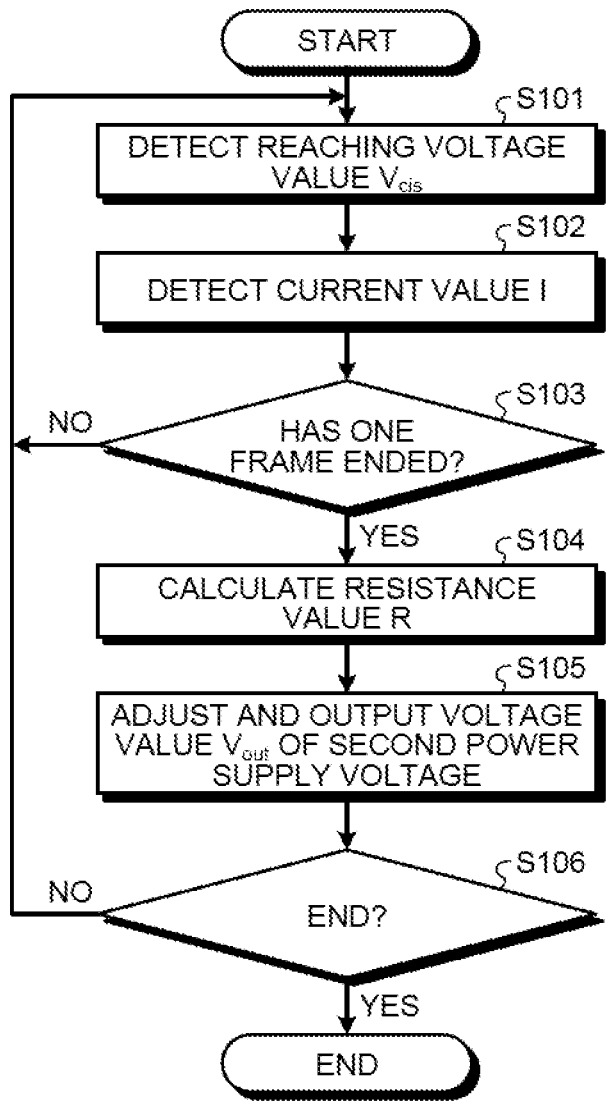
FIG. 3 is a flowchart illustrating an outline of processing executed by the endoscope system according to the first embodiment.
Figure 4:
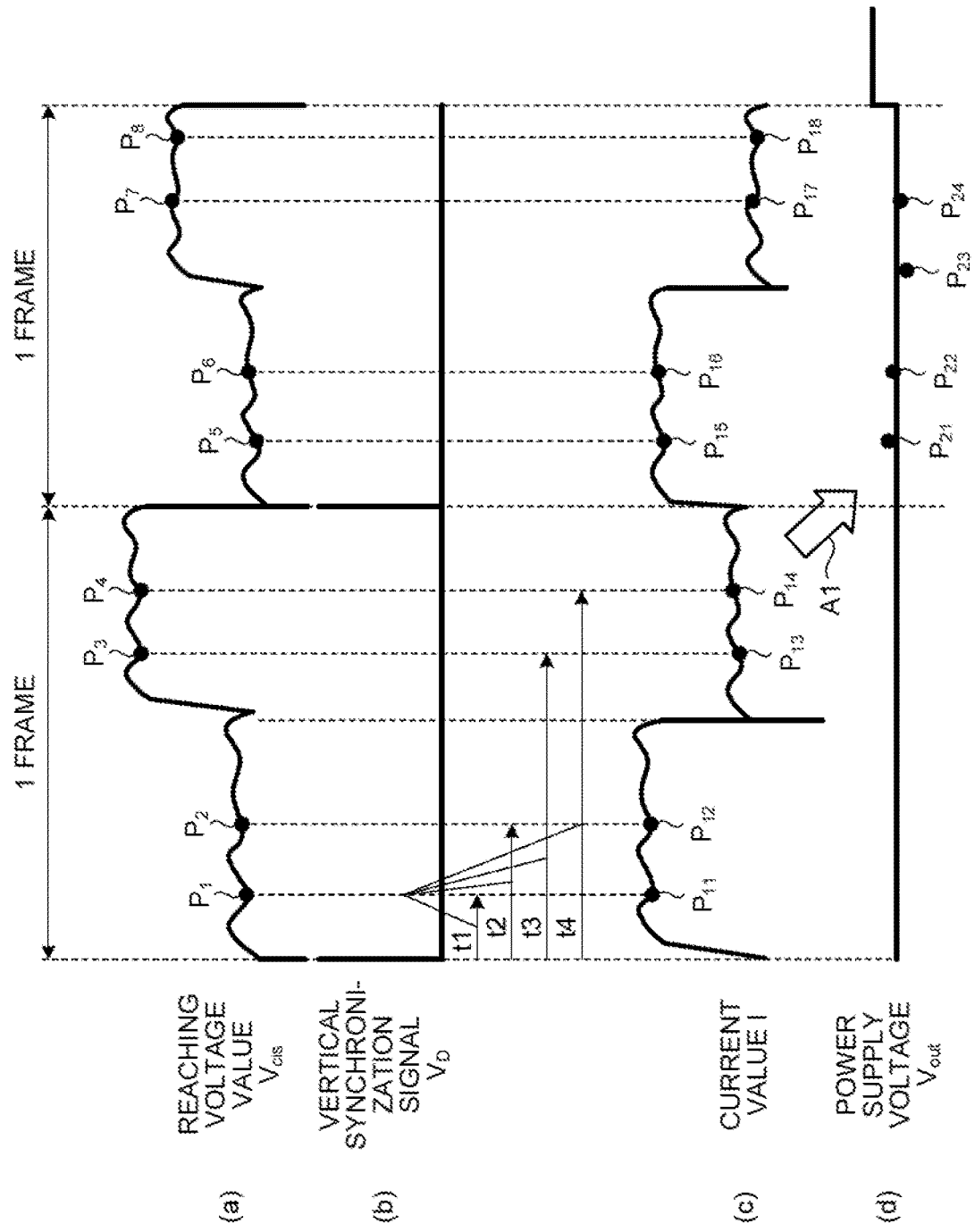
FIG. 4 is a timing chart illustrating a relationship between a reaching voltage value, a vertical synchronization signal, a current value, and a resistance value of a transmission cable during processing executed by the endoscope system according to the first embodiment.

Next, processing executed by the endoscope system 1 will be described. FIG. 3 is a flowchart illustrating an outline of processing executed by the control device 5. FIG. 4 is a timing chart illustrating a relationship between the reaching voltage value $V_{cis}$, the vertical synchronization signal $V_D$, the current value I, and the resistance value R of the transmission cable 200 at the time of processing executed by the endoscope system 1. In FIG. 4, (a) from the top illustrates the reaching voltage value $V_{cis}$, (b) illustrates the vertical synchronization signal $V_D$, (c) illustrates the current value I, and (d) illustrates the voltage value $V_{out}$ of the power supply voltage supplied to the imaging element by the power source 51. In FIG. 4, the current value I and the resistance value R in the signal line 201 of the transmission cable 200 are described. However, since similar processing is executed in the other signal lines 202 and 203, a detailed description is omitted.

As illustrated in FIG. 3, first, under the control of the imaging controller 125, the A/D converter 122 detects the power supply voltage VDD1 supplied from the control device 5 via the signal line 201 of the transmission cable 200 as the reaching voltage value $V_{cis}$ that has reached the imaging element 120 (Step S101). In this case, as illustrated in FIG. 4, the A/D converter 122 adds an elapsed time (for example, times t1, t2, t3, and t4) elapsed from the vertical synchronization signal $V_D$ as time information and outputs the time information and the reaching voltage value $V_{cis}$ to the signal processor 123 every time the reaching voltage value $V_{cis}$ (P1, P2, P3, and P4) is detected at a predetermined interval under the control of the imaging controller 125. At this time, under the control of the imaging controller 125, the signal processor 123 outputs the time information and the reaching voltage value $V_{cis}$ to the control device 5 via the signal line 201 of the transmission cable 200 every time the reaching voltage value $V_{cis}$ and the time information are input from the A/D converter 122.

Subsequently, the current detector 52 detects the current value I of the signal line 201 of the transmission cable 200 (Step S102). Specifically, as illustrated in FIG. 4, the current detector 52 detects the current value I of the current flowing through the signal line 201 at predetermined intervals under the control of the control unit 57, and outputs the detection result to the control unit 57. In this case, every time the current value I (P11, P12, P13, and P14) is detected, the current detector 52 adds an elapsed time (for example, times t1, t2, t3, and t4) elapsed from the vertical synchronization signal $V_D$ as the time information and outputs the current value I and the time information to the control unit 57.

Thereafter, the control unit 57 determines whether or not one imaging frame of the imaging element 120 has ended based on the vertical synchronization signal $V_D$ supplied to the imaging element 120 (Step S103). In a case where the control unit 57 determines that one imaging frame of the imaging element 120 has ended (Step S103: Yes), the endoscope system 1 proceeds to Step S104 to be described later. On the other hand, in a case where the control unit 57 determines that one imaging frame of the imaging element 120 has not ended (Step S103: No), the endoscope system 1 returns to Step S101 described above.

Next, the calculator 571 calculates the resistance value of the signal line 201 of the transmission cable 200 based on the reaching voltage value $V_{cis}$ input from the imaging element 120, the current value I input from the current detector 52, and the voltage detection value $V_{mon}$ (Step S104). Specifically, assuming that the resistance value of the signal line 201 is R, the reaching voltage value is $V_{cis}$, the current value flowing through the signal line 201 is I, and the voltage detection value of the power supply voltage supplied by the power source 51 and detected by the voltage detector 53 is $V_{mon}$, the resistance value R of the signal line 201 is calculated based on the following Equation (1).

$$R=(V_{mon}-V_{cis})/I \quad (1)$$

In addition, the calculator 571 calculates the resistance value R of the signal line 201 based on the reaching voltage value $V_{cis}$ and the current value I at the same time recorded in the memory 56. In this case, the calculator 571 calculates the resistance value R of the signal line 201 a plurality of times for each same time based on the reaching voltage value $V_{cis}$ and the current value I at the same time recorded in the memory 56, and calculates the average value of the plurality of calculation results as the resistance value of the signal line 201.

Thereafter, under the control of the control unit 57, the power source controller 54 adjusts the power supply voltage to be supplied from the power source 51 to the imaging element 120 and outputs the adjusted power supply voltage (Step S105). Specifically, in a case where a voltage value of the power supply voltage VDD1, which is the second power supply voltage, is $V_{out}$, and a voltage value of a target power supply voltage, which is an optimum value of the power supply voltage in the imaging element 120, is $V_{target}$, the power source controller 54 adjusts the power supply voltage to be supplied to the imaging element 120 by the power source 51 by using the following Equation (2) and outputs the adjusted power supply voltage.

$$V_{out}=RI+V_{target} \quad (2)$$

In this case, as indicated by an arrow A1 in FIG. 4, the power source controller 54 outputs the voltage value $V_{out}$ of the power supply voltage VDD1, which is the second power supply voltage adjusted in the previous frame of the imaging element 120, in the next frame of the imaging element 120 based on the vertical synchronization signal $V_D$.

Subsequently, in a case where an instruction signal for ending inspection of the subject is input (Step S106: Yes), the endoscope system 1 ends the processing. On the other hand, in a case where the instruction signal for ending the inspection of the subject is not input (Step S106: No), the endoscope system 1 returns to Step S101 described above.

According to the first embodiment described above, the power source controller 54 adjusts the voltage value $V_{out}$ of the power supply voltage VDD1 to be supplied from the power source 51 to the imaging element 120 based on the current value detected by the current detector 52, the reaching voltage value $V_{cis}$ calculated by the control unit 57, the voltage value $V_{target}$ of the target power supply voltage, and the voltage detection value $V_{mon}$ of the second power supply voltage, and supplies the adjusted voltage value of the power supply voltage VDD1 to the signal line 201 of the transmission cable 200. Therefore, it is possible to operate the imaging element 120 at an appropriate power supply voltage while preventing a diameter of the signal line 201 from being increased while maintaining a transmission rate. As a result, a diameter of a power supply line connecting the control device 5 and the imaging element 120 can be decreased, and an optimum power supply voltage can be supplied, so that heat generated by the power supply voltage can be minimized to suppress an influence on a body tissue.

Furthermore, according to the first embodiment, since the A/D converter 122 provided in the imaging element 120 detects the reaching voltage value $V_{cis}$, and it is not necessary to separately provide a detection circuit for detecting the voltage value in the imaging element 120, it is possible to prevent an increase in size of the imaging element 120.

In addition, according to the first embodiment, since the control unit 57 calculates the resistance value of the signal line 201 for each detection based on the time information at the time of detection of each of the reaching voltage value $V_{cis}$ and the current value I, and the reaching voltage value $V_{cis}$ and the current value I at the same time, it is possible to accurately calculate the resistance value R of the signal line 201.

In addition, according to the first embodiment, since the time information at the time of the detection of the reaching voltage value $V_{cis}$ by the A/D converter 122 based on the vertical synchronization signal $V_D$ is output to the signal line 205 of the transmission cable 200, the control unit 57 can accurately calculate the resistance value R of the signal line 201.

In addition, according to the first embodiment, since the control unit 57 calculates the resistance value of the signal line 201 of the transmission cable 200 a plurality of times in a predetermined period, and calculates the average value of the plurality of calculation results as the resistance value of the signal line 201, it is possible to accurately calculate the resistance value R of the signal line 201.

Furthermore, according to the first embodiment, the A/D converter 122 detects the reaching voltage value $V_{cis}$ for each blanking period of the imaging element 120, and the control unit 57 calculates the resistance value R of the signal line 201 of the transmission cable 200 based on the reaching voltage value $V_{cis}$ and the current value I detected by the current detector 52 for each blanking period. After the resistance value is once calculated, the optimum power supply voltage can be output following the current value detected based on Equation (2).

Second Embodiment

Next, a second embodiment will be described. An endoscope system according to the second embodiment is different from the endoscope 2 according to the first embodiment described above in terms of a configuration and a procedure to be executed. Hereinafter, the configuration of the endoscope system according to the second embodiment will be described, and then processing executed by the endoscope system will be described. Note that the same components as those of the endoscope system 1 according to the first embodiment described above are denoted by the same reference signs, and a detailed description thereof will be omitted.

Configuration of Endoscope System

Figure 5:
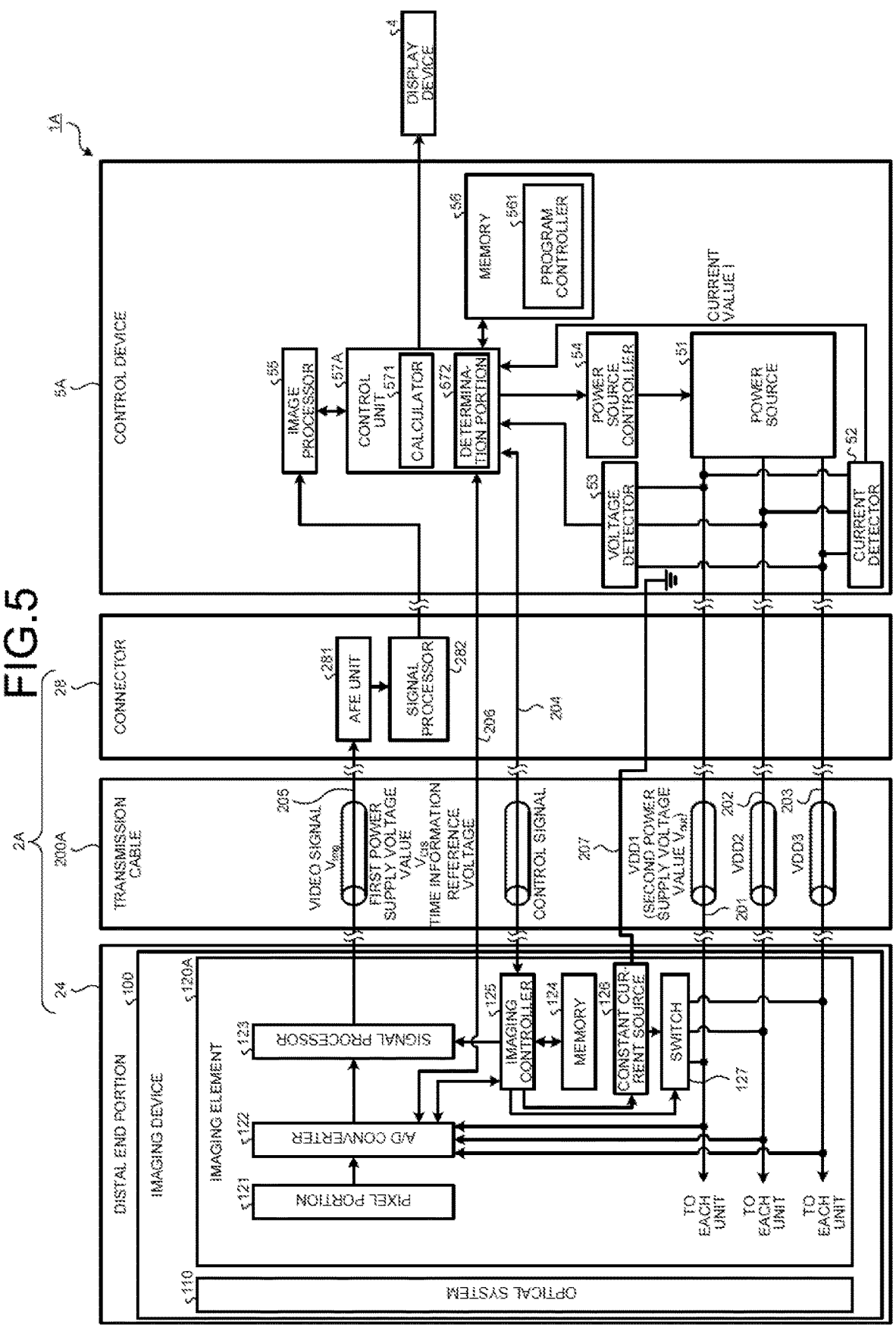
FIG. 5 is a block diagram illustrating a functional configuration of a main part of an endoscope and a control device in an endoscope system according to a second embodiment.

FIG. 5 is a block diagram illustrating a functional configuration of main parts of an endoscope and a control device in the endoscope system according to the second embodiment. An endoscope system 1A illustrated in FIG. 5 includes an endoscope 2A and a control device 5A instead of the endoscope 2 according to the first embodiment described above.

Configuration of Endoscope

As illustrated in FIG. 5, the endoscope 2A includes an imaging element 120A instead of the imaging element 120 according to the above-described first embodiment in the endoscope 2 according to the above-described first embodiment. The imaging element 120A includes an imaging controller 125A, a constant current source 126, and a switch 127 in addition to the configuration according to the first embodiment described above.

The constant current source 126 is electrically connected to each of signal lines 201 to 203 of a transmission cable 200A. Under the control of the imaging controller 125A, the constant current source 126 implements power supply voltages VDD1 to VDD3 supplied from the control device 5A via the signal lines 201 to 203 of the transmission cable 200A, and the constant current source 126 is implemented using a regulator or the like. Note that the constant current source 126 is grounded via a signal line 207 and the control device 5A. The constant current source 126 can adjust a current value flowing through the signal lines 201 to 203. Here, in a case where a current value at a timing when a resistance value is calculated is $I_{mon}$ and a current value flowing at a timing when a voltage is adjusted is I, the following relationship holds.

$$V_{out}=(V_{mon}-V_{cis})/I_{mon} \times I \qquad (3)$$

Furthermore, an output voltage $V_{out}$ has the following output due to an error α of the voltage detector or the AD converter of the imaging element.

$$V_{out}=(V_{mon}-V_{cis})/I_{mon}*I+\alpha/I_{mon} \times I \qquad (4)$$

Therefore, in a case where the current value of $I_{mon}$ is small, the influence of the error increases, so that the current value $I_{mon}$ at the timing of resistance calculation can be increased using the constant current source 126 to increase the accuracy of DC resistance value calculation.

One end of the switch 127 is electrically connected to each of the signal lines 201 to 203 of the transmission cable 200A, and the other end is electrically connected to the constant current source 126. The switch 127 electrically connects each of the signal lines 201 to 203 of the transmission cable 200A and the constant current source 126 under the control of the imaging controller 125A. The switch 127 is implemented by using a switch, a semiconductor switch, or the like.

The imaging controller 125A controls the switch 127 based on a control signal input from a control unit 57A of the control device 5A via a signal line 204 of the transmission cable 200A. Specifically, in a calculation period in which the control unit 57A calculates a resistance value R of the signal line 201 of the transmission cable 200A, the imaging controller 125A stops operation of units other than an A/D converter 122 and a signal processor 123 among units included in the imaging element 120A. Furthermore, the imaging controller 125A drives the switch 127 under the control of the control unit 57A. Specifically, in a case where a determination signal of a determination result indicating that the current value detected by the current detector 52 is equal to or less than a predetermined threshold is input from a determination portion 572 of the control unit 57A to be described later, the imaging controller 125A electrically connects the constant current source 126 and the signal line 201 to the switch 127.

Configuration of Control Device

Next, a configuration of the control device 5A will be described. The control device 5A includes the control unit 57A instead of the control unit 57 according to the first embodiment described above. The control unit 57A further includes the determination portion 572 in addition to the configuration of the control unit 57 according to the above-described first embodiment.

The determination portion 572 determines whether or not the current value calculated by the calculator 571 is equal to or less than a predetermined threshold.

Processing in Endoscope System

Figure 6:
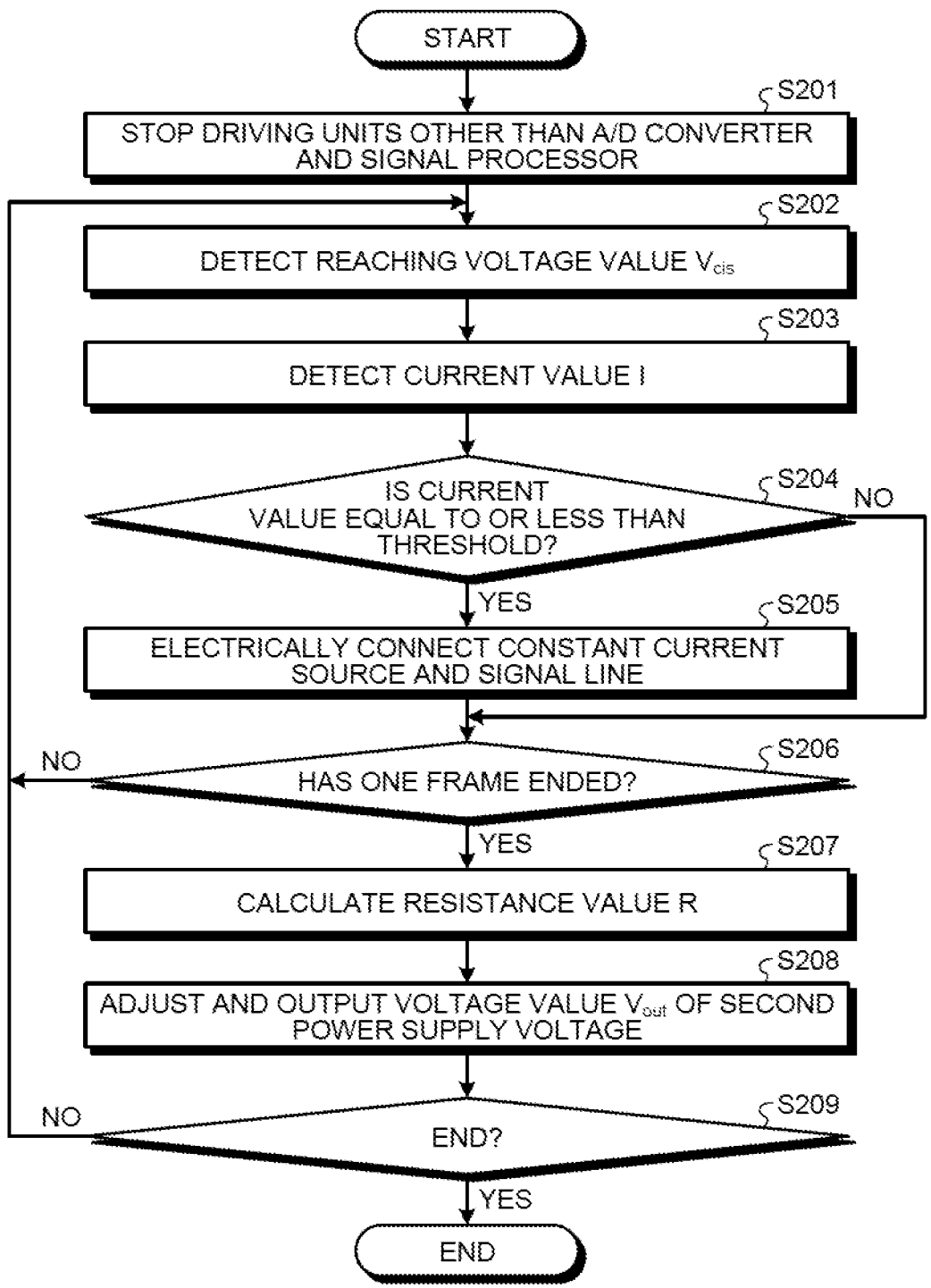
FIG. 6 is a flowchart illustrating an outline of processing executed by the endoscope system according to the second embodiment.

Next, processing executed by the endoscope system 1A will be described. FIG. 6 is a flowchart illustrating an outline of processing executed by the endoscope system 1A.

As illustrated in FIG. 6, first, in a calculation period in which the control unit 57A calculates the resistance value R of the signal line 201 of the transmission cable 200A, the imaging controller 125A stops operation of units other than the A/D converter 122 and the signal processor 123 among the units included in the imaging element 120A (Step S201).

Steps S202 and S203 correspond to Steps S101 and S102 described above, respectively.

In Step S204, the control unit 57A determines whether or not the current value I of the current flowing through the signal line 201 of the transmission cable 200A, detected by the current detector 52 is equal to or less than a predetermined threshold. In a case where the control unit 57A determines that the current value I of the current flowing through the signal line 201 of the transmission cable 200A, detected by the current detector 52 is equal to or less than the predetermined threshold (Step S204: Yes), the endoscope system 1A proceeds to Step S205 described later. On the other hand, in a case where the control unit 57A determines that the current value I of the current flowing through the signal line 201 of the transmission cable 200A, detected by the current detector 52 is not equal to or less than the predetermined threshold (Step S204: No), the endoscope system 1A proceeds to Step S206 described later.

In Step S205, the imaging controller 125A electrically connects the constant current source 126 and the signal line 201 of the transmission cable 200A to the switch 127. After Step S205, the endoscope system 1A proceeds to Step S206 described later.

Steps S206 to S209 correspond to Steps S103 to S106 described above, respectively. After Step S209, the endoscope system 1A ends the processing.

According to the second embodiment described above, in the calculation period in which the control unit 57A calculates the resistance value R of the signal line 201 of the transmission cable 200A, the imaging controller 125A stops operation of units other than the A/D converter 122 and the signal processor 123 among the units included in the imaging element 120A, so that the accurate resistance value R of the signal line 201 can be calculated.

In addition, according to the second embodiment, in a case where the control unit 57A determines that the current value I of the current flowing through the signal line 201 of the transmission cable 200A, detected by the current detector 52 is equal to or less than the predetermined threshold, the imaging controller 125A electrically connects the constant current source 126 and the signal line 201 of the transmission cable 200A to the switch 127. Therefore, it is possible to increase the current value $I_{mon}$ at the timing of resistance calculation by using the current source to increase the accuracy of DC resistance value calculation. Furthermore, noise generated in the A/D converter 122 can be reduced, and variation in current consumption can be suppressed.

Third Embodiment

Next, a third embodiment will be described. An endoscope system according to the third embodiment is different from the endoscope system 1 according to the first embodiment described above in terms of a configuration. Hereinafter, a configuration of the endoscope system according to the third embodiment will be described. Note that the same components as those of the endoscope system 1 according to the first embodiment described above are denoted by the same reference signs, and a detailed description thereof will be omitted.

Functional Configuration of Main Part of Endoscope System

Figure 7:
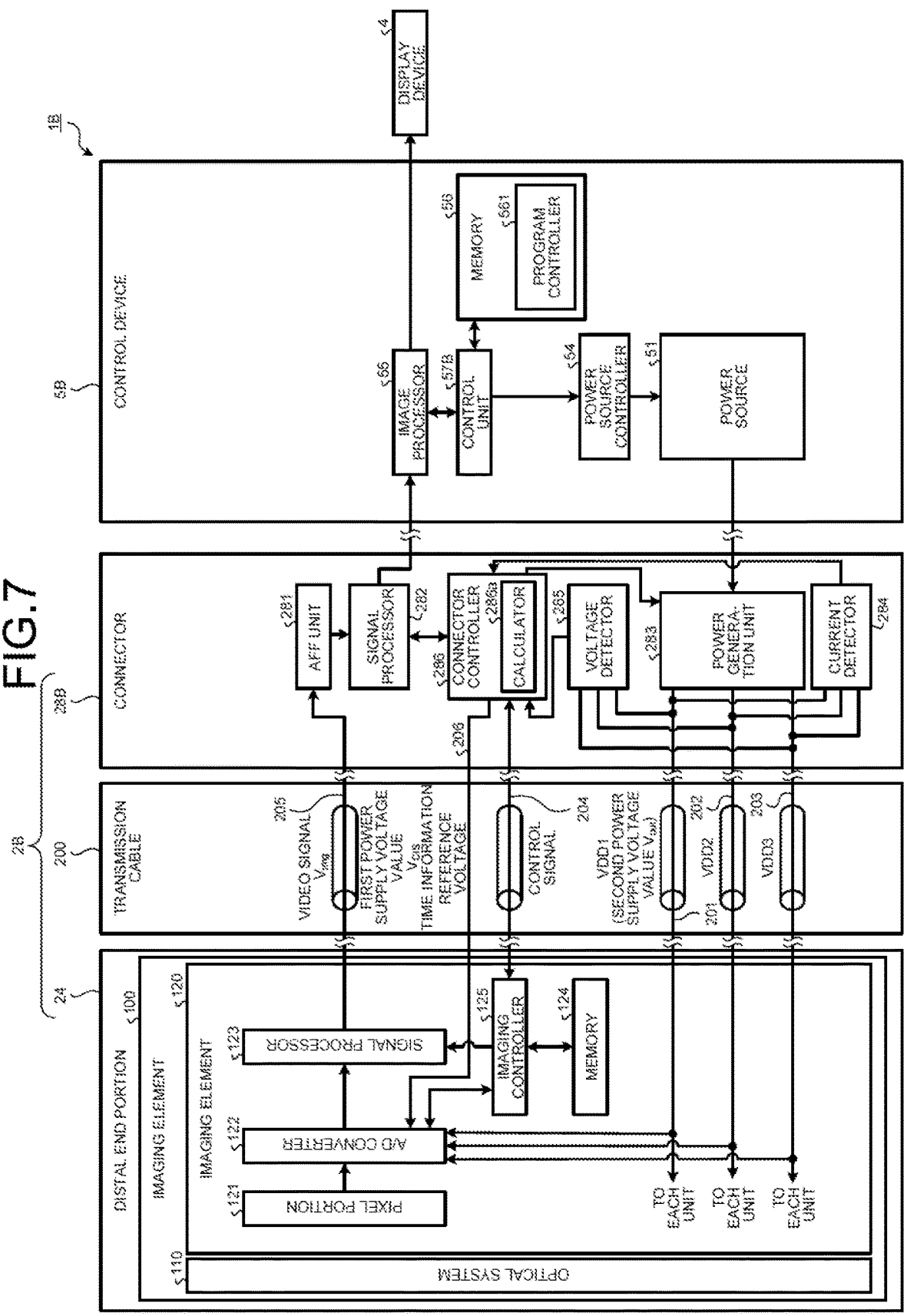
FIG. 7 is a block diagram illustrating a functional configuration of a main part of an endoscope and a control device in an endoscope system according to a third embodiment.

FIG. 7 is a block diagram illustrating a functional configuration of a main part of an endoscope and a control device in the endoscope system according to the third embodiment. An endoscope system 1B illustrated in FIG. 7 includes an endoscope 2B and a control device 5B instead of the endoscope 2 and the control device 5 according to the first embodiment described above.

Configuration of Endoscope

First, a configuration of the endoscope 2B will be described. The endoscope 2B includes a connector 28B instead of the connector 28 according to the above-described first embodiment. The connector 28B includes a power generation unit 283, a current detector 284, and a voltage detector 285 in addition to the configuration of the connector 28 according to the first embodiment described above.

Under the control of a connector controller 286, the power generation unit 283 generates a plurality of power supply voltages (power supply voltages VDD1 to VDD3) from a power supply voltage input from a power source 51 of the control device 5B, and outputs the generated power supply voltages to a transmission cable 200 (signal lines 201 to 203). The power generation unit 283 is implemented by using, for example, a smoothing circuit, a rectifier circuit, a transformer, or the like.

The current detector 284 is electrically connected to each of the signal lines 201 to 203. The current detector 284 detects a current value of each of the signal lines 201 to 203 and outputs the detection result to the connector controller 286. The current detector 284 is implemented using an ammeter or the like.

The voltage detector 285 is electrically connected to each of the signal lines 201 to 203. The voltage detector 285 detects a voltage value of each of the signal lines 201 to 203 and outputs the detection result to the connector controller 286. The voltage detector 285 is implemented using a voltmeter or the like.

The connector controller 286 adjusts voltage values of the plurality of power supply voltages output from the power generation unit 283 to predetermined voltage values and outputs the voltage values to the power generation unit 283. The connector controller 286 is implemented by using a memory or hardware such as an FPGA. A calculator 286a is provided. The calculator 286a has the same function as the calculator 571 described above.

Main Part of Control Device

Next, a configuration of the control device 5B will be described.

The control device 5B does not include the current detector 52 and the voltage detector 53 in the configuration of the control device 5 according to the first embodiment described above. Furthermore, the control device 5B includes a control unit 57B instead of the control unit 57 according to the first embodiment described above. The control unit 57B does not include the calculator 571 of the control unit 57 according to the first embodiment described above.

According to the third embodiment described above, the same effects as those of the first embodiment described above are obtained, and it is possible to perform an operation at an appropriate power supply voltage while preventing the diameter of the signal line 201 from being increased while maintaining the transmission rate.

In the third embodiment described above, the power generation unit 283, the current detector 284, the voltage detector 285, and the connector controller 286 are provided in the connector 28B. However, the present disclosure is not limited thereto, and for example, the power generation unit 283, the current detector 284, the voltage detector 285, and the connector controller 286 may be provided in the operating unit 22.

OTHER EMBODIMENTS

Various embodiments can be formed by appropriately combining a plurality of constituent elements disclosed in the endoscope systems according to the first to third embodiments of the present disclosure described above. For example, some constituent elements may be deleted from all the constituent elements described in the endoscope systems according to the embodiments of the present disclosure described above. Furthermore, the constituent elements described in the endoscope systems according to the embodiments of the present disclosure described above may be appropriately combined.

Furthermore, in the endoscope systems according to the first to third embodiments of the present disclosure, the "unit" or "portion" described above can be replaced with "means", "circuit", or the like. For example, the control unit can be replaced with control means or a control circuit.

Note that, in the description of the flowcharts in the present specification, the context of processing between steps is clearly indicated using expressions such as "first", "thereafter", and "subsequently", but the order of processing necessary for implementing the disclosure is not uniquely determined by these expressions. That is, the order of processing in the flowcharts described in the present specification can be changed within a range without inconsistency.

Although some of the embodiments of the present application have been described in detail with reference to the drawings, these are merely examples, and the disclosure can be implemented in other forms in which various modifications and improvements have been made based on the knowledge of those skilled in the art, including the aspects described in the section of the present disclosure.

According to the disclosure, it is possible to perform an operation at an appropriate power supply voltage while preventing a diameter of a signal line from being increased while maintaining a transmission rate.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging system comprising:
an imaging unit configured to generate a video signal by imaging a subject;
a control device configured to control the imaging unit;
a first signal line configured to transmit a predetermined power supply voltage to the imaging unit; and
a second signal line configured to transmit the video signal to the control device,
wherein the imaging unit includes
an imaging element including
a pixel portion configured to generate the video signal according to a light reception amount and output the generated video signal to the second signal line, and
a first detector configured to detect a voltage value of a power supply voltage that has reached the imaging unit via the first signal line as a voltage value of a first power supply voltage and output the voltage value to the second signal line, and
the control device includes:
a power source configured to supply a voltage value of a second power supply voltage to the imaging element via the first signal line;
a second detector configured to detect a current value in the first signal line;
a third detector configured to detect the voltage value of the second power supply voltage supplied by the power source;
a calculator configured to calculate a resistance value of the first signal line based on the voltage value of the first power supply voltage, the current value, and a voltage detection value of the second power supply voltage detected by the third detector;
a power source controller configured to adjust the voltage value of the second power supply voltage to be supplied to the imaging element by the power source based on the current value, the resistance value, and a voltage value of a target power supply voltage in the imaging element, and supply the adjusted second power supply voltage to the first signal line;
wherein the first detector is configured to add time information at a time of detection of the voltage value of the first power supply voltage to the voltage value of the first power supply voltage and output the voltage value of the first power supply voltage and the time information to the second signal line, and
the calculator is configured to calculate the resistance value for each detection based on the time information at a time of detection of each of the voltage value of the first power supply voltage and the current value, and the voltage value of the first power supply voltage and the current value at a same time.

2. The imaging system according to claim 1, wherein the calculator is configured to calculate the resistance value of the first signal line based on the following Equation (1):

$$R=(V_{mon}-V_{cis})/I \quad (1)$$

in which the resistance value of the first signal line is R, the voltage value of the first power supply voltage is $V_{cis}$, the current value is I, and the voltage detection value of the second power supply voltage detected by the third detector is $V_{mon}$, and
the power source controller is configured to adjust the voltage value of the second power supply voltage based on the following Equation (2):

$$V_{out}=RI+V_{target} \quad (2)$$

in which the voltage value of the second power supply voltage is $V_{out}$ and the voltage value of the target power supply voltage is $V_{target}$.

3. The imaging system according to claim 1, wherein the first detector includes an A/D conversion circuit configured to perform A/D conversion on the video signal and output a digital video signal to the second signal line, and
the A/D conversion circuit is electrically connected to the first signal line, and is configured to perform A/D conversion on the voltage value of the first power supply voltage and output the voltage value of the first power supply voltage to the second signal line.

4. The imaging system according to claim 1, wherein the imaging unit is configured to be driven in synchronization with a vertical synchronization signal, and
the first detector is configured to output, to the second signal line, time information at a time of detection of the voltage value of the first power supply voltage based on the vertical synchronization signal.

5. The imaging system according to claim 1, wherein the calculator is configured to calculate the resistance value a plurality of times in a predetermined period, and calculate an average value of a plurality of calculation results as the resistance value.

6. The imaging system according to claim 1,
wherein the first detector is configured to detect the voltage value of the first power supply voltage for each blanking period of the imaging element, and
the calculator is configured to calculate the resistance value for each blanking period, based on the voltage value of the first power supply voltage, the current value, and the voltage detection value of the second power supply voltage.

7. The imaging system according to claim 1,
wherein the imaging unit further includes an imaging controller configured to stop operation of units other than the first detector among units included in the imaging unit in a calculation period in which the calculator calculates the resistance value.

8. The imaging system according to claim 7,
wherein the imaging unit further includes:
a constant current source configured to adjust the current value of the first signal line to an adjustable current value; and
a switch configured to electrically connect the first signal line and the constant current source,
the control device further includes a determination portion configured to determine whether or not the current value is equal to or less than a predetermined threshold, and
the imaging controller is configured to cause the switch to electrically connect the first signal line and the constant current source when the determination portion determines that the current value is equal to or less than the predetermined threshold.

9. An endoscope comprising:
an imaging unit configured to generate a video signal by imaging a subject;
a connector that is connectable to a control device;
a first signal line configured to transmit a predetermined power supply voltage to the imaging unit; and
a second signal line configured to transmit the video signal to the control device,
wherein the imaging unit includes
an imaging element including
a pixel portion configured to generate the video signal according to a light reception amount and output the generated video signal to the second signal line, and
a first detector configured to detect a voltage value of a power supply voltage that has reached the imaging unit via the first signal line as a voltage value of a first power supply voltage and output the voltage value to the second signal line, and
the connector includes:
a power source configured to supply a second power supply voltage to the imaging element via the first signal line;
a second detector configured to detect a current value in the first signal line;
a calculator configured to calculate a resistance value of the first signal line based on the voltage value of the first power supply voltage, the current value, and a voltage detection value of the second power supply voltage;
a power source controller configured to adjust the voltage value of the second power supply voltage to be supplied to the imaging element by the power source based on the current value, the resistance value, and a voltage value of a target power supply voltage which is an optimum value of the power supply voltage in the imaging element, and supply the adjusted second power supply voltage to the first signal line;
wherein the first detector is configured to add time information at a time of detection of the voltage value of the first power supply voltage to the voltage value of the first power supply voltage and output the voltage value of the first power supply voltage and the time information to the second signal line, and
the calculator is configured to calculate the resistance value for each detection based on the time information at a time of detection of each of the voltage value of the first power supply voltage and the current value, and the voltage value of the first power supply voltage and the current value at a same time.

10. A control device electrically connectable to an imaging unit configured to generate a video signal by imaging a subject by using a first signal line configured to transmit a predetermined power supply voltage to the imaging unit and a second signal line configured to transmit the video signal, the control device comprising:
a power source configured to supply a second power supply voltage to the imaging unit via the first signal line;
a second detector configured to detect a current value in the first signal line;
a third detector configured to detect a voltage value of the second power supply voltage;
a calculator configured to calculate a resistance value of the first signal line based on a voltage value of a first power supply voltage that has reached the imaging unit via the first signal line and that is detected in the imaging unit, the current value, and a voltage detection value of the second power supply voltage detected by the third detector;
a power source controller configured to adjust the voltage value of the second power supply voltage to be supplied to the imaging unit by the power source based on the current value, the resistance value, and a voltage value of a target power supply voltage which is an optimum value of the power supply voltage in the imaging unit, and supply the adjusted second power supply voltage to the first signal line;
wherein the first detector is configured to add time information at a time of detection of the voltage value of the first power supply voltage to the voltage value of the first power supply voltage and output the voltage value of the first power supply voltage and the time information to the second signal line, and
the calculator is configured to calculate the resistance value for each detection based on the time information at a time of detection of each of the voltage value of the first power supply voltage and the current value, and the voltage value of the first power supply voltage and the current value at a same time.

* * * * *